Figure 1:
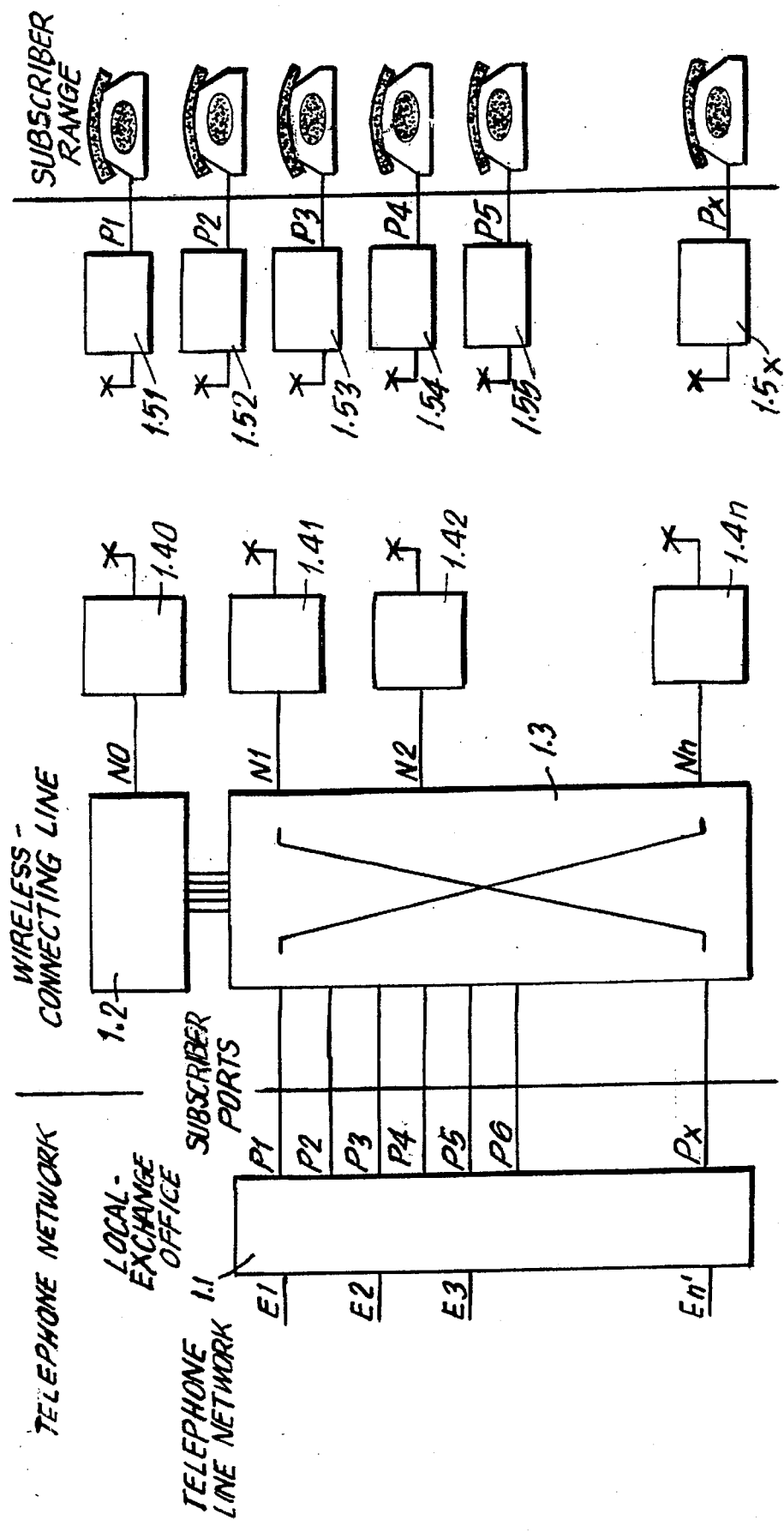

United States Patent [19]
Schiffel et al.

[11] Patent Number: 5,666,398
[45] Date of Patent: Sep. 9, 1997

[54] SWITCHING EQUIPMENT AND METHOD FOR RADIOTELEPHONE SYSTEM OF THE LOCAL OR PRIVATE BRANCH EXCHANGE TYPE

[75] Inventors: Reinhard Schiffel; Klaus Jäckel; Bruno Stadler; Holger Vogel; Andreas Hachenberger; Detlef Herold, all of Berlin, Germany

[73] Assignee: Jenoptik Communications GmbH, Jena, Germany

[21] Appl. No.: 256,686

[22] PCT Filed: Nov. 19, 1993

[86] PCT No.: PCT/DE93/01100

§ 371 Date: Jan. 17, 1995

§ 102(e) Date: Jan. 17, 1995

[87] PCT Pub. No.: WO94/13112

PCT Pub. Date: Jun. 9, 1994

[51] Int. Cl.$^6$ ............................................. H04Q 7/20
[52] U.S. Cl. .................... 370/280; 455/466; 455/403
[58] Field of Search ................... 379/58, 59, 60, 379/61, 63, 201, 207, 219, 230; 455/11.1, 15, 33.1

[56] References Cited

U.S. PATENT DOCUMENTS 4,675,863   6/1987   Paneth et al. ..................... 379/59

FOREIGN PATENT DOCUMENTS

| | | |
|---|---|---|
| 0111972 | 6/1984 | European Pat. Off. . |
| 0311966 | 4/1989 | European Pat. Off. . |
| 04974908 | 8/1992 | European Pat. Off. . |
| 3814728 | 11/1989 | Germany . |
| 4128811 | 3/1993 | Germany . |
| 4240249 | 5/1994 | Germany . |
| 2247811 | 3/1992 | United Kingdom . |

OTHER PUBLICATIONS

G. Mandel et al, Nochrichtentech, Elektron., Berlin, vol. 42 pp. 130–135 (1992).
P. Leopold, ntz., vol. 45 pp. 286–287 (1992).
Horst Mayr.–Stein et al, Nachrichten, vol. 87 pp. 35–43 (1991).
C. Buckingham et al., IEEE Comm. Mag., pp. 105–110 (1991).

*Primary Examiner*—Dwayne Bost
*Assistant Examiner*—William G. Trost
*Attorney, Agent, or Firm*—Sprung Horn Kramer & Woods

[57] ABSTRACT

A radio telephone system is disclosed to satisfy in the short term basic telecommunication needs of areas which are insufficiently or not yet covered. The system has a number of duplex radio channels (transmission channels) substantially smaller than the number of radio telephone subscribers. These transmission channels are connected to the ports of a telecommunications exchange system which is part of the stationary radio station and which ensures both incoming and outgoing traffic with the public telecommunications network and internal exchanges within the system. Signalling, exchange, management, servicing, and special functions of radio operation between the stationary radio station and the subscriber connection device are ensured by a radio switching device which uses one, or if required, several transmission channels used as organization channels and not connected to the ports of the telecommunications exchange system. In the organization channel, a constant time-multiplexed communication is maintained with the subscriber connection device according to a random access process based on a special organization channel protocol. An essential characteristic of the invention is that the subscriber connection devices have an a/b interface for the connection of telecommunication terminals. The system and in particular the organization channel protocol are designed in such a way that no differences from a wired telecommunications connection are perceptible to the user, although the system is radio operated.

20 Claims, 9 Drawing Sheets 5,666,398

SWITCHING EQUIPMENT AND METHOD FOR RADIOTELEPHONE SYSTEM OF THE LOCAL OR PRIVATE BRANCH EXCHANGE TYPE

TECHNICAL FIELD

The invention relates to a radiotelephony system according to the introductory part of claim 1.

STATE OF THE ART

Multi-user systems for the radio-supported connection of telephone subscribers to the public telephone network are widely used. The following categories are principally involved:

1. Radio Networks

These are primarily characterized by roaming and handover (overload) functions with all the consequences resulting therefrom for network control, and the need to be able to use mobile equipment at high speeds of up to 200 km/h and the resultant requirements to be met by the radio transmission process.

2. Checker Networks

Like the mobile radio networks, these have the roaming and handover properties, but with regard to subscriber range, territorial area, functionality and especially access to the public systems they are subject to the above-named limitations.

3. Systems Based on Cordless Telephone Technology

In this case, systems are primarily offered which are to disconnect the cordless telephone from a particular main connection and extend the territorial range of use to the area of a PABX by inserting a handover.

4. DAL (Wireless Connection Line [hereinafter WCL])

These are characterized by the wireless connection of stationary subscribers in a subscriber-equal connection of the radio transmission. That is to say, in the telephone exchange a subscriber connection is present for each subscriber, and the radio transmission apparatus is inserted between these subscriber connections and the radio subscribers.

5. Rural Networks

These are characterized by the fact that from a main central office or repeating center they produce a point-to-multipoint connection in territorially widely separated areas, and radio links are used. Channel groups are transmitted, which can be split up in the transmission path into several planes and are transferred to a number of endpoints. From these endpoints the subscribers are connected usually by cable routes, and if radio is used a channel-equal connection is usually made. No switching functions are created in rural networks.

Radiotelephone systems are widely used, and are usually designed as mobile telephone systems. For this reason they are constructed as cellular systems and overlappingly serve a larger area in which they enable subscribers to have mobile connection to telephone traffic. For this purpose these systems must perform overload and roaming functions, i.e., the subscriber using a mobile telephone has to be "forwarded" when changing from one cell to an adjacent cell, and the system must remember the current location of a mobile subscriber to be able to send a call to that subscriber.

These systems therefore operate generally with an overlay network which connects the individual radio cells to one another and through which the entire control of the system as well as the telephone connections of the subscribers are connected. Only at a few select points does this overlay network have transitions into the public telephone network. Connections from one network into the other can be produced by special dialing.

On account of these apparatus, mobile telephone systems are substantially more expensive than stationary telephone service, which has an effect both on the flat rates and on the call charges.

Another difference from the standard telephone is that special terminal equipment is used, which in the first place is expensive, since the radio components have to be capable of mobile use, and in the second place it is different in operation from standard telephones.

The mobile telephone system is therefore employed mainly in the expansion of an existing and fully developed stationary telephone system.

The use of radiotelephone systems among subscribers is not very common, because in general the connection of the subscriber's terminal device through a subscriber connection line to the nearest telephone exchange is a cost-attractive solution for telephone systems which historically have continually been expanding.

Changes which may lead to a reversal of this judgment can be the following:

Underserviced areas have to be opened up as soon as possible, because local wiring is becoming a capacity bottleneck (material and operating capacity) and an excessive financial burden.

There are heavily settled regions that must be opened up, which would raise the cost of wiring more than usual.

Regions of difficult geological conditions (rocklands, tropical rain regions etc.) or difficult morphological conditions (tropical rainforest) are to be opened, which make the laying of cable expensive or in some cases even impossible.

A system of this kind is, for example, WCL (wireless connection line), which is used for the reasons described in the first of the above subparagraphs.

This communications technology is basically constructed as shown in FIG. 1. It is a basic feature that a local exchange apparatus 1.1 must be present, which is not a component of the WCL system, which is connected through the inputs E1 to En' to the telephone network, and has a free capacity of input/output intersections called "ports" (ports P1 to Px) which must be at least equal to the number of subscribers to be connected.

As shown in FIG. 1, the WCL apparatus has an exchange system 1.3, whose inputs are connected to the ports of the local exchange 1.1 and which performs the switching to the outputs N1 to Nn to which the message channels 1.41 to 1.4n are connected, x being>>n>n'. If a connection is called for, the port P1 and the subscriber connection device 1.51 are switched to a free message channel 1.4 or the corresponding frequency command is performed.

The commanding of the subscriber connection device is performed by the switching unit through an output NO to which the message channel 1.40 is connected, which is used as the control channel and is constantly received by all inactive subscriber connection devices.

This kind of concept can be called 1:1 switching; it can be embodied at relatively low cost as regards control expense, and if necessary can be easily replaced by wiring the subscriber connections. A disadvantage is the high costs involved in the multiple interconnection of exchanges.

The solution offered by the invention has substantially the same purpose as WCL systems, but due to its special concept it obviates the operational and economic disadvantages of the "subscriber-equal switching" of WCL. Only remotely is there any resemblance to systems based on cordless telephone technology, and the limitations of this technology are overcome by the solution according to the invention.

The solution according to the invention sets itself clearly apart from the other categories as regards its purpose and hence from the principles and methods of other types of solutions and thus is in no way even in competition with these systems.

In (1) a system configuration is described which has the same objective as the present invention, but is based on the invitation to bid of the DBP of December 1991 on the WCL system (WCL=Wireless Connection Line) and is constructed using components of the NMT-900 (900 MHz Nordic Mobile Telephone System). The basic difference is that switching from the radio communication exchange to the local communication exchange (OVSt) is performed through a two-wire connection to the a/b interface of the main distributor, thereby achieving "subscriber-equal connection."

This concept does have the advantage that it offers considerable compatibility with the communication centrals common in the less developed countries, but it assumes that communication centrals are present with a number of free a/b interfaces corresponding to the number of planned radio subscribers, which generally is not the case. On the other hand, the solution becomes unacceptable economically because a WCL converter has to be switched to each a/b interface of the exchange apparatus, which performs a conversion from the two-wire interface to a four-wire interface, concentrates the traffic, simulates a telephone terminal apparatus at the a/b interface of the local exchange, and generates the dialing information which an MSC (mobile switching center) in a real NMT 900 mobile radio network normally awaits at its input.

On the other hand, in the present invention the telephone exchange system is a component of the overall system, and instead of the "subscriber-equal connection" a "channel-equal connection" is performed, i.e., the communication system communicates directly with the available radio channels without going through the subscriber plane, and is telephonically wired as a dialing device. This reduces the number of connection units to the number of the radio channels, and the number of functions of the connecting units is reduced. Furthermore, switching can be conducted inside of the cell, and if the subscriber structure is appropriate it considerably reduces the number of channels into the public system which is impossible in (1).

The content of the description in (2) is directly related to (1). Here it is mainly the insertion strategy that is dealt with, and to that end it is shown that the WCL systems are thought of as a temporary solution which, at a given time, will be replaced by wiring in the subscriber connection area, on which the disadvantages and limitations discussed in connection with (1) are based.

Figure 2:
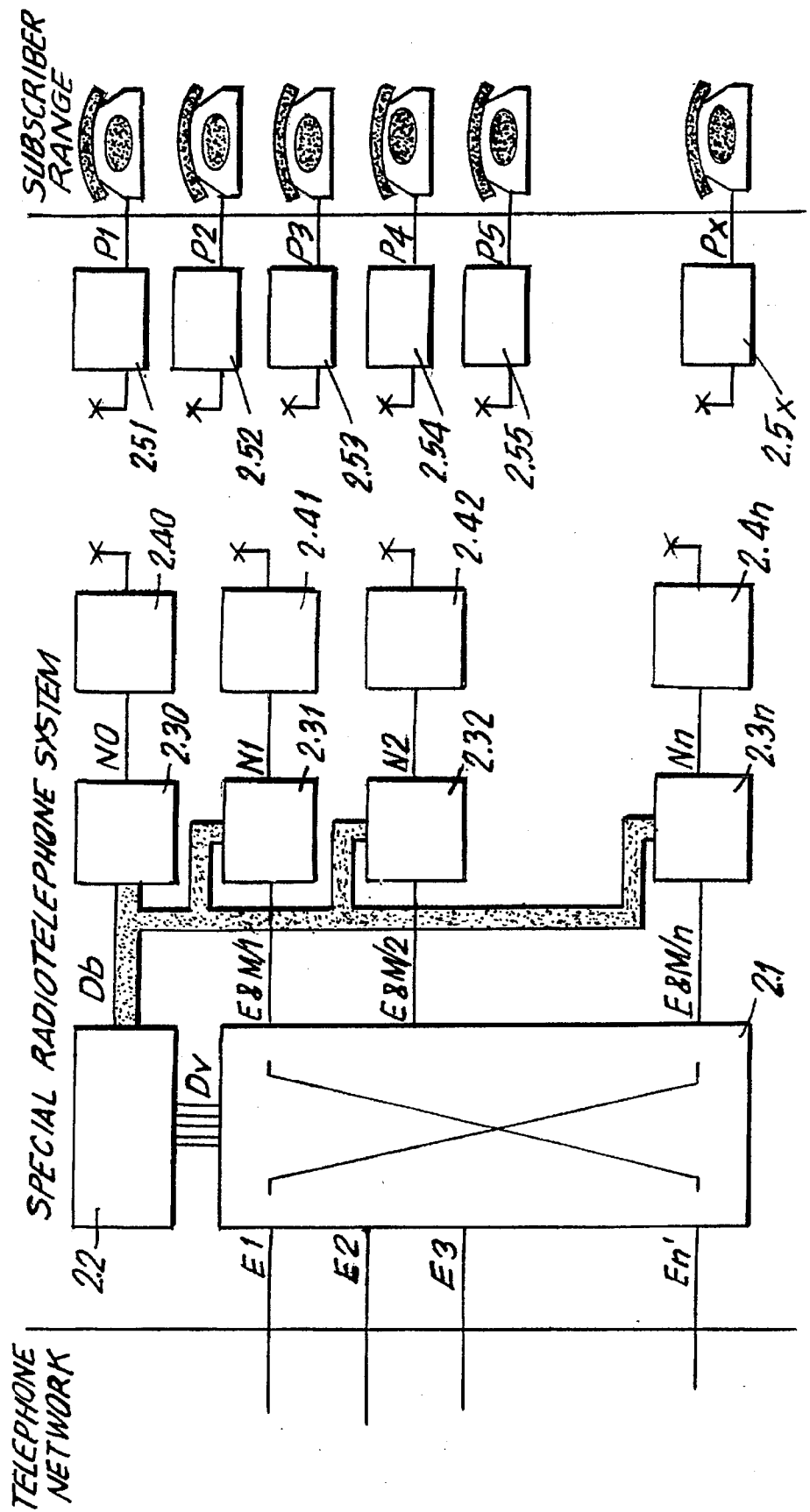

One important disadvantage of the WCL system described in FIG. 2 on the basis of analog cellular mobile radio technology is that, although any terminal instrument approved for connection to an a/b interface (telephone, fax, modem etc.) can be used by the subscriber, the assignment of a radio channel is not performed until after the selection of the last dialing number and it is performed after an adjustable waiting period. This characteristic is the result of the virtually modified use of mobile radio components which, differently from the a/b interface, do not transfer the dial signals to the base station until after the dial selection and a manual start signal has been completed at the mobile apparatus. In the case of the method described in (1) and (2), the manual start signal is replaced by the running down of a timer switch which resets to zero after each entry of a dialing number and is restarted.

As a result, the subscriber, after entering the dialing numbers, for a fairly long time receives no response to the outgoing call and a number of automatically operating subscriber telephones cannot be operated at these WCL terminals.

In contrast, the present invention contains a special radio communication process which builds up the radio connection right while the subscriber is dialing, and assures that the last dialing numbers selected by the subscriber are transferred in real time through the assigned talk channel, and after completing the dialing the subscriber is already directly connected to the network and receives call tones or busy tones directly from the other end, and thus even at this point the subscriber can detect no difference from a wired a/b central connection.

In (3) a system configuration is described which has the same purpose as the present invention, but the concept of which is not identical with (1) and (2). That is, the fundamental difference from the present system according to the invention consists in the fact that the connection of the radio exchange to the local relay exchange (OVSt) is made through a two-wire connection to the a/b interface of the main distributor, so that a "subscriber-equal connection" is achieved. So the same appraisals as made in (1) and (2) apply here.

In (4) a configuration is described which has a purpose similar to the present invention, but it differs in important inventional features. It is assumed here that a PABX-CPU for all communication and service feature control purposes, and a mobile CPU for the making and breaking control for cordless telephones, cooperate through a common bus and the mobile CPU is subordinated. The result is that the mobile CPU has to be developed so as to be adapted to a particular PABX or can cooperate only with one particular PABX that has been developed for them.

On the other hand, the present solution according to the invention sets out from the fact that at least in one variant a radio communication system is connected exclusively through E&M interfaces (physical E&M interfaces or PCM interface with an E&M configuration) or also other interfaces of a PABX or PSTN with the PABX or PSTN, and there is no bus connection nor any subordination. E&M ports or E&M interfaces are input/output interfaces (6 physical or logical input/output interfaces of 2 lines each for audio signal transfer and 2 lines for directionally selective line seizure/acknowledgement or directionally selective pulse dialing transfer). Thus, the connection is made possible to any PABX or PSTN that may be present in or planned for the point of use, which can be important especially in developing countries.

Furthermore, it is a feature of (4) that no switching takes place in the radio area, but only the making and breaking of connections between subscriber I/F interface modules and radio subscribers. A prioritized subscriber P1 is directed to a subscriber interface I/F module, which results for this subscriber in a blocking rate=0. Nonprioritized subscribers are fixedly associated severally with a subscriber interface module I/F, which signifies a high blocking rate for these subscribers. Thus there are great similarities to (1), (2) and (3), so that certain judgments made in those cases are also applicable here.

Instead, the present solution according to the invention sets out from the fact that the PABXes or PSTNs are operated as a dialing system, and a true switching is made in the radio range (channel random mode access), i.e., each subscriber has its own call number and for the purpose of incoming or outgoing traffic can be directed to any free I/F interface module that is not a subscriber interface module and is permanently connected with a radio channel. In this manner it is brought about according to the invention that the number of interface modules is not greater than the number of the needed radio channels and thus a high effectiveness of use is achieved.

In (5) a solution is described which is based on the DECT standard and, using a TDM/TDMA/TDD process, permits the wireless connection of subscribers to PABXes or PSTNs. In the system a digital transmission of 32 kilobits per second per channel is used, 8 channels being transmitted on an RF carrier, requiring an overall gross data rate of 640 kbit/s.

This concept has two fundamental consequences:

1. TDMA frame with a duration of 16 ms is divided into 8 channel frames for the direction from the base station to the subscriber phones and 8 channel frames for the direction from the subscriber phones to the base station, resulting in a period of 1 ms for the individual channel frames.

Thus, there are no reserves for the equalization of propagation time differences (different distances between subscriber apparatus and the base station) and the system is limited to very short distances of up to 300 meters.

To quantify these statements: the attainment of a service range of 30 km radius requires leeways of 0.2 ms between the emissions of two successive transmitting subscriber apparatus.

2. For the transfer of 8 channels in duplex operation a radiofrequency bandwidth of 1 MHz is occupied, which is acceptable only in the case of the minimal ranges and the low transmission powers of 80 mW which they entail.

The present solution according to the invention sets out for the purpose of achieving service ranges of a radius of more than 30 kilometers, and therefore it must use fundamentally different approaches. Thus, on the basis of the chosen analog transmission process, up to 120 channels with an RF bandwidth of less than 700 kHz are transmitted in the direction from the base station to the subscriber apparatus, and in the direction from the subscriber apparatus to the base station the problem of leeway time is avoided by using an FDMA process.

A concept adequate to the basic idea of (5) is developed in (6), but in this case, not for portables on the DECT standard, but an older standard for cordless telephones. The invention is to remove the limitation of the radius of use of cordless telephones to a few hundred feet around the place where the base station of the individual user is located, by installing a plurality of decentralized stationary single-channel radio bases in one area of use (territory or building) and connecting them to a PABX. This involves no alteration (expansion) of the service range of the individual base station. By means of an appropriate access process including handover a cordless telephone can access each of these radio base stations and is thus given a larger territorial range of use. The system can serve several cordless telephones.

On the other hand, the present solution according to the invention has a central multichannel base station to serve a large territory, so that handover for small areas is unnecessary. In addition to these differences in purpose and system structure, it is mainly the control mechanisms that are different. While in (6) the inventive content concentrates on coupling PABX protocol with the protocol of cordless telephone systems, in the solution according to the invention the user has a main switchboard with an a/b interface that can be used without restriction.

In (7) as in (5) a solution is described which through the use of a TDM/TDMA/TDD process permits the wireless connection of subscribers to PABXes. In this special system at least one channel is permanently associated with each subscriber telephone in the TDM frame. If a telephone is outside of the radio service range of the central radio station, a subscriber apparatus in a territorially suitable position is used as a repeater in addition to its basic function. The subscriber served through a repeater then occupies two channels in the TDM frame. No more than two repeaters can be inserted into the transmission route, in which case a subscriber telephone occupies three channels. Another special feature of the proposed process is that the system is able to configure itself as regards the distribution of the repeater functions and channel distribution. Consequences are a low channel efficiency (channel traffic figure equals the traffic figure of the individual subscriber or only one-half or one-third in repeater use) and the creation of relationships between subscriber sets (subscriber repeater sets are subject to special requirements which this subscriber must then respect).

In contrast, in the present invention the independence of the subscriber sets is strictly preserved, and by the use of a radio exchange process with channel random mode access a high channel efficiency is attained (traffic figure in the channel is approximately 10 times the traffic figure of the individual subscriber).

BRIEF DESCRIPTION OF THE INVENTION

In an analog or combination analog-digital radio transmission system for telephone systems with a stationary base station and a plurality of stationary subscriber stations independent of one another, the present invention is addressed to the problem of applying an appropriate exchange principle and a matching organization and handling in the system. Details of the invention are described with the aid of the schemes represented in the drawings, as follows:

FIG. 1 Configuration of a wireless connecting line

FIG. 2 Configuration of a radiotelephony system with E&M

Figure 3:
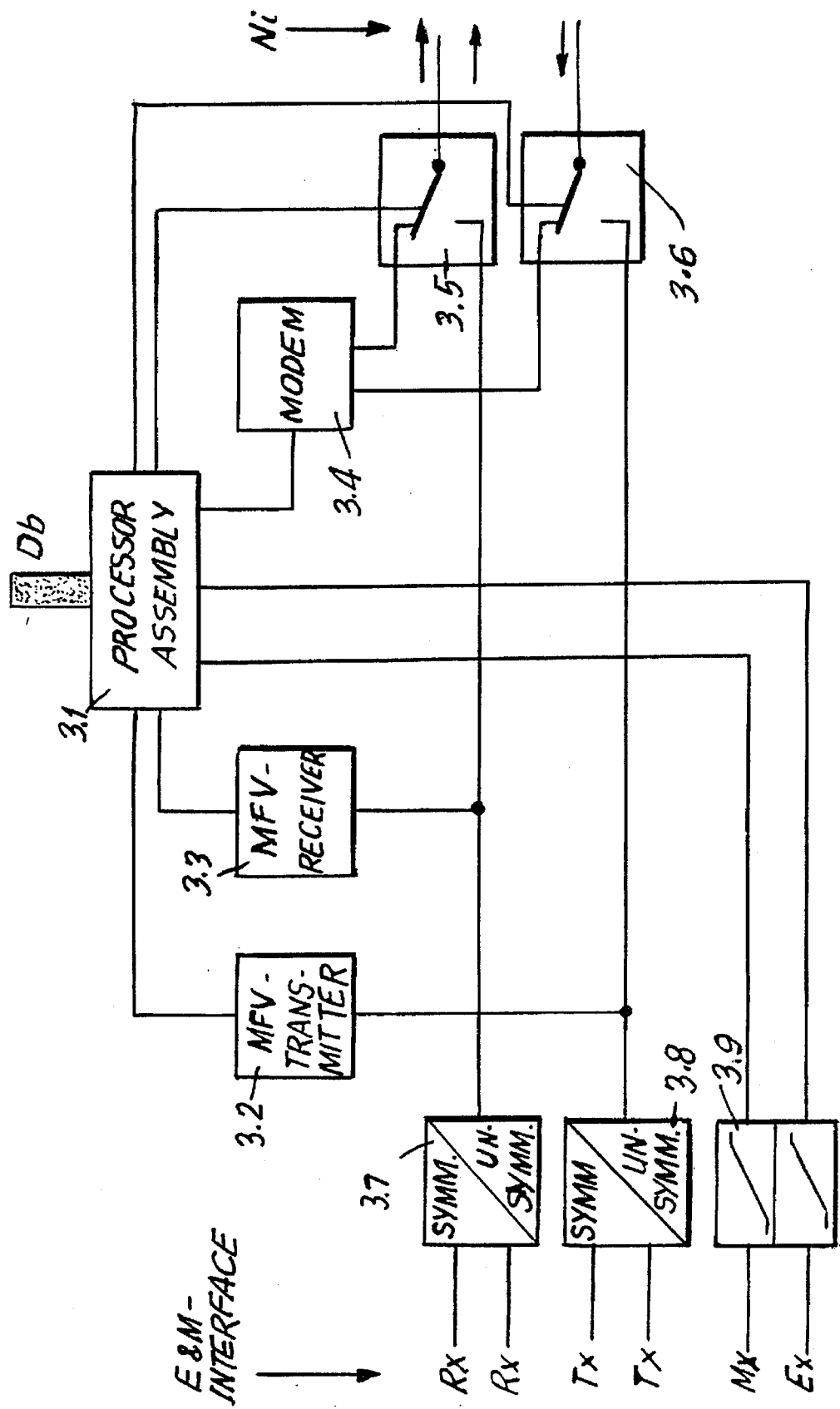

FIG. 3 Channel controller for operation with an E&M interface

Figure 4:
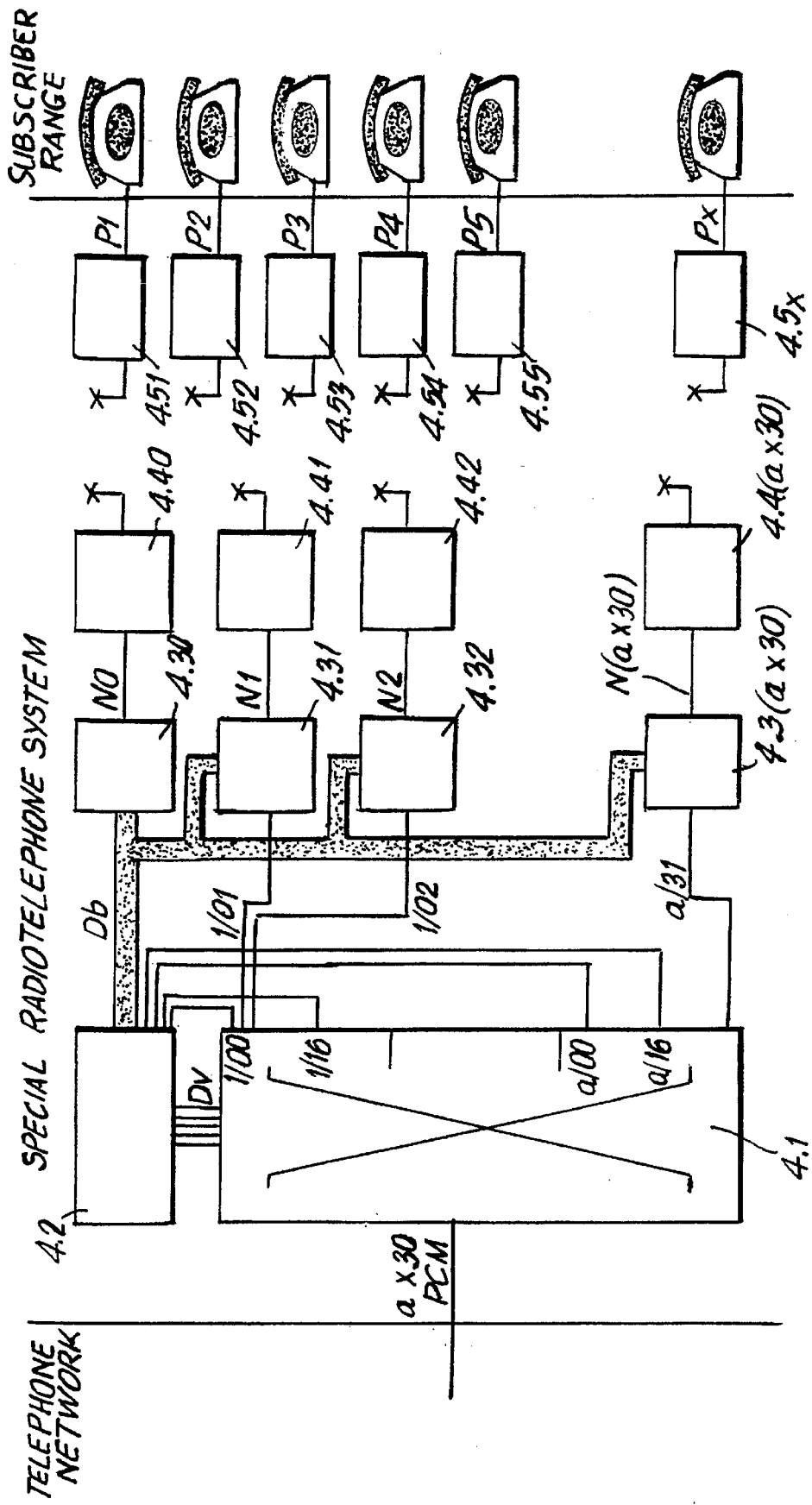

FIG. 4 Configuration of a radiotelephony system with PCM interface

Figure 5:
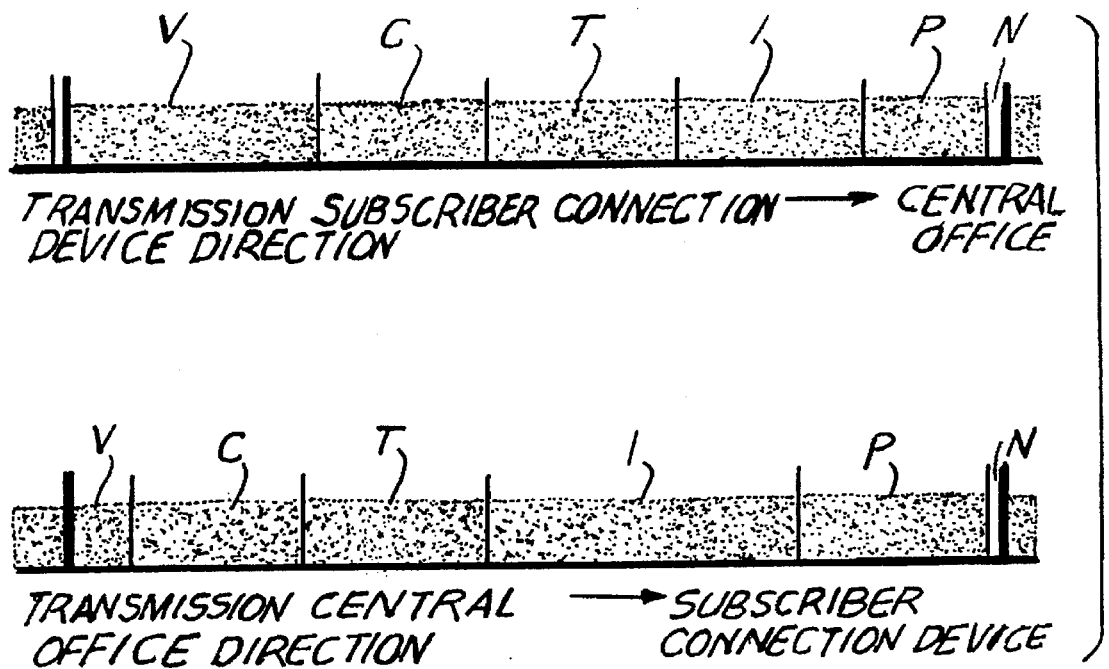

FIG. 5 Data frame in the control channel

Figure 6:
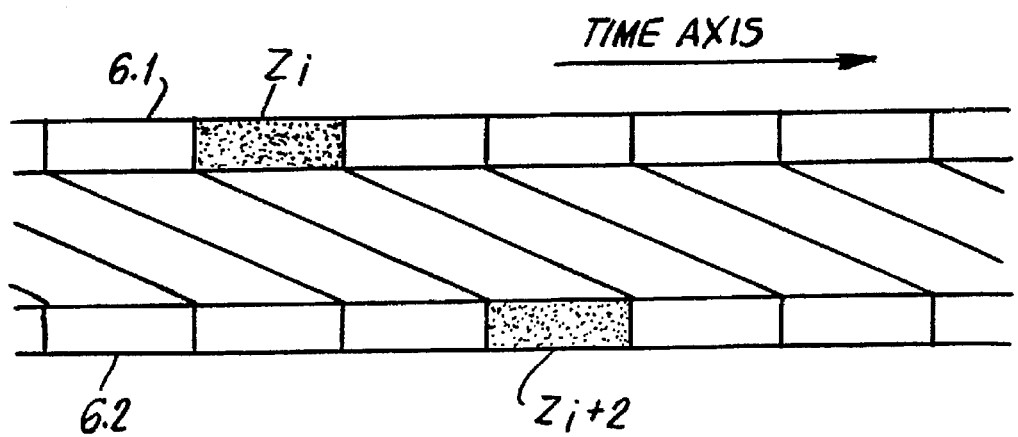

FIG. 6 Control channel operation

Figure 7:
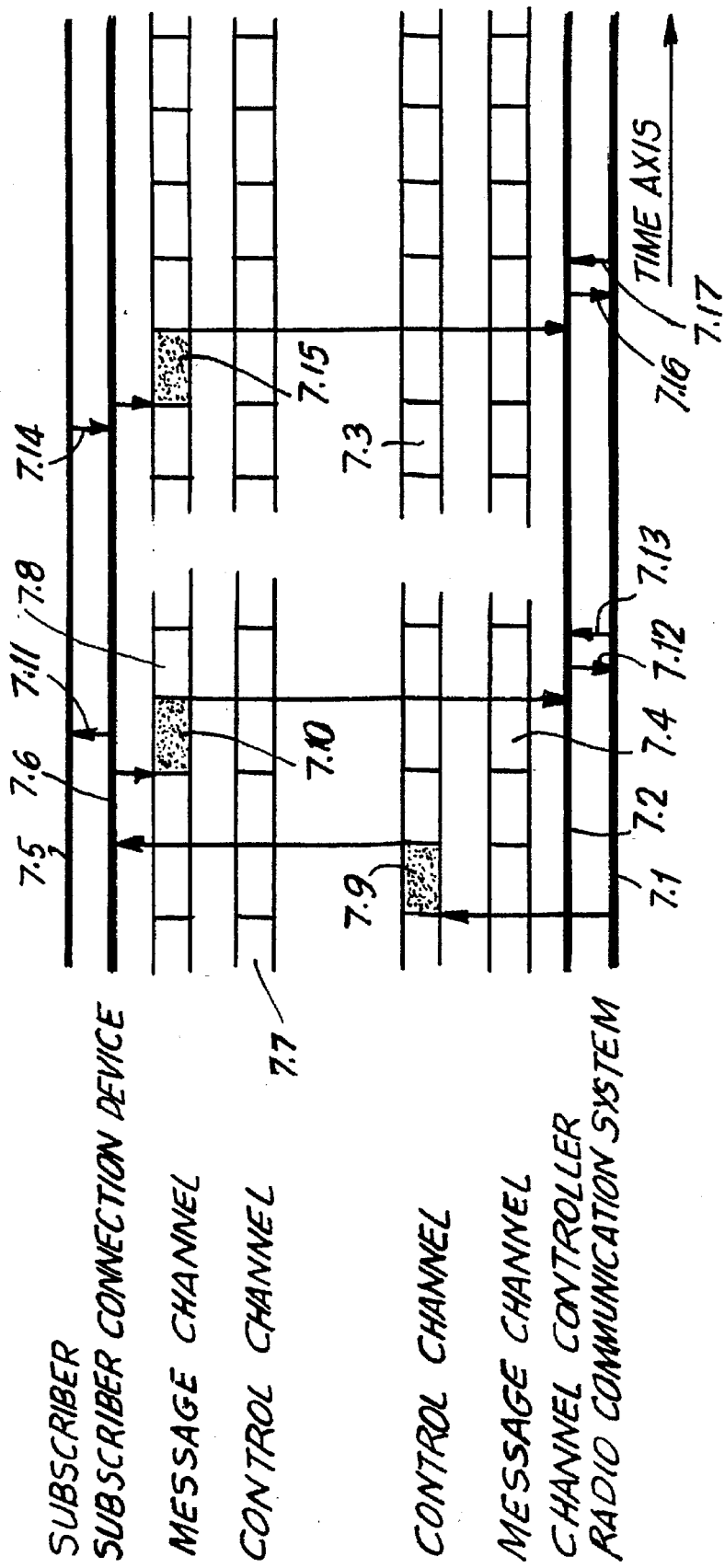
Figure 8:
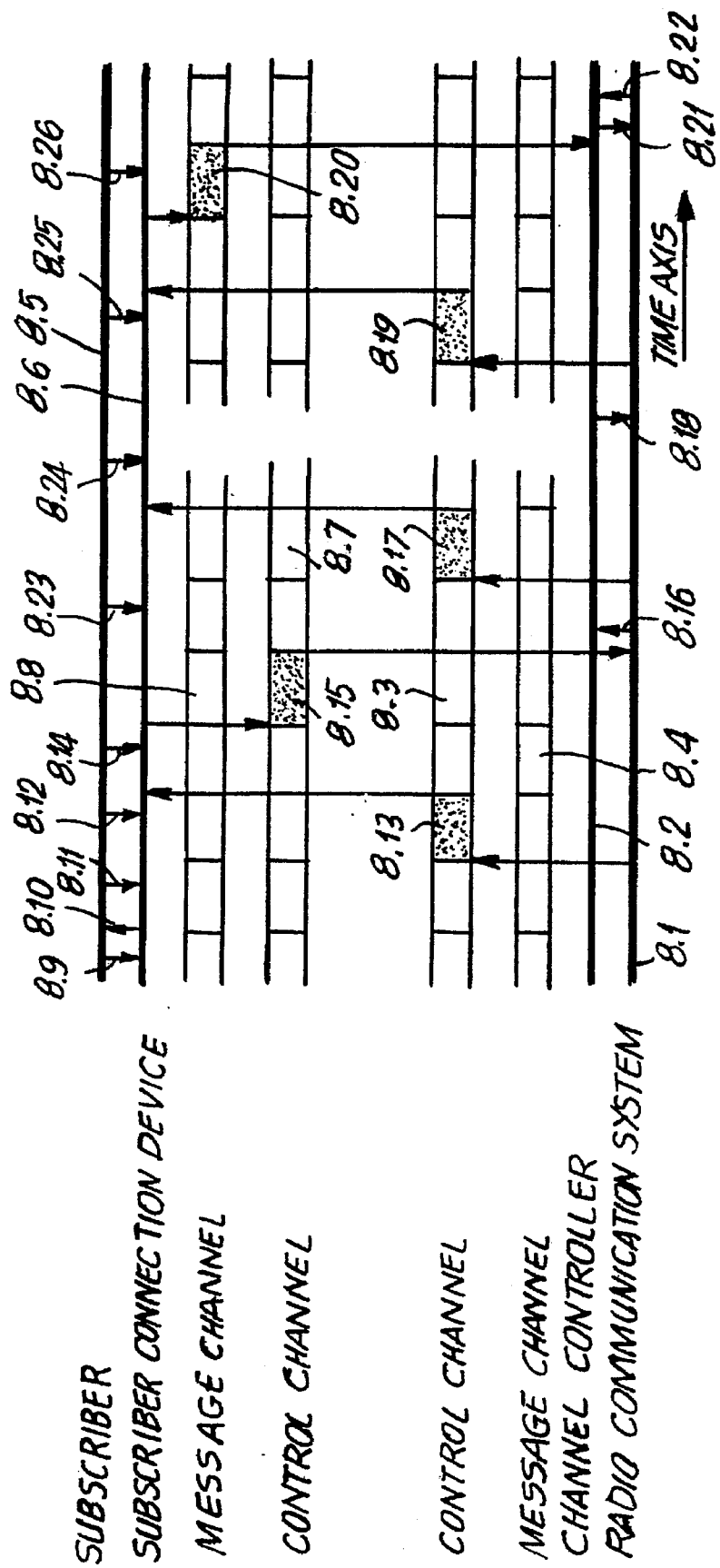
Figure 9:
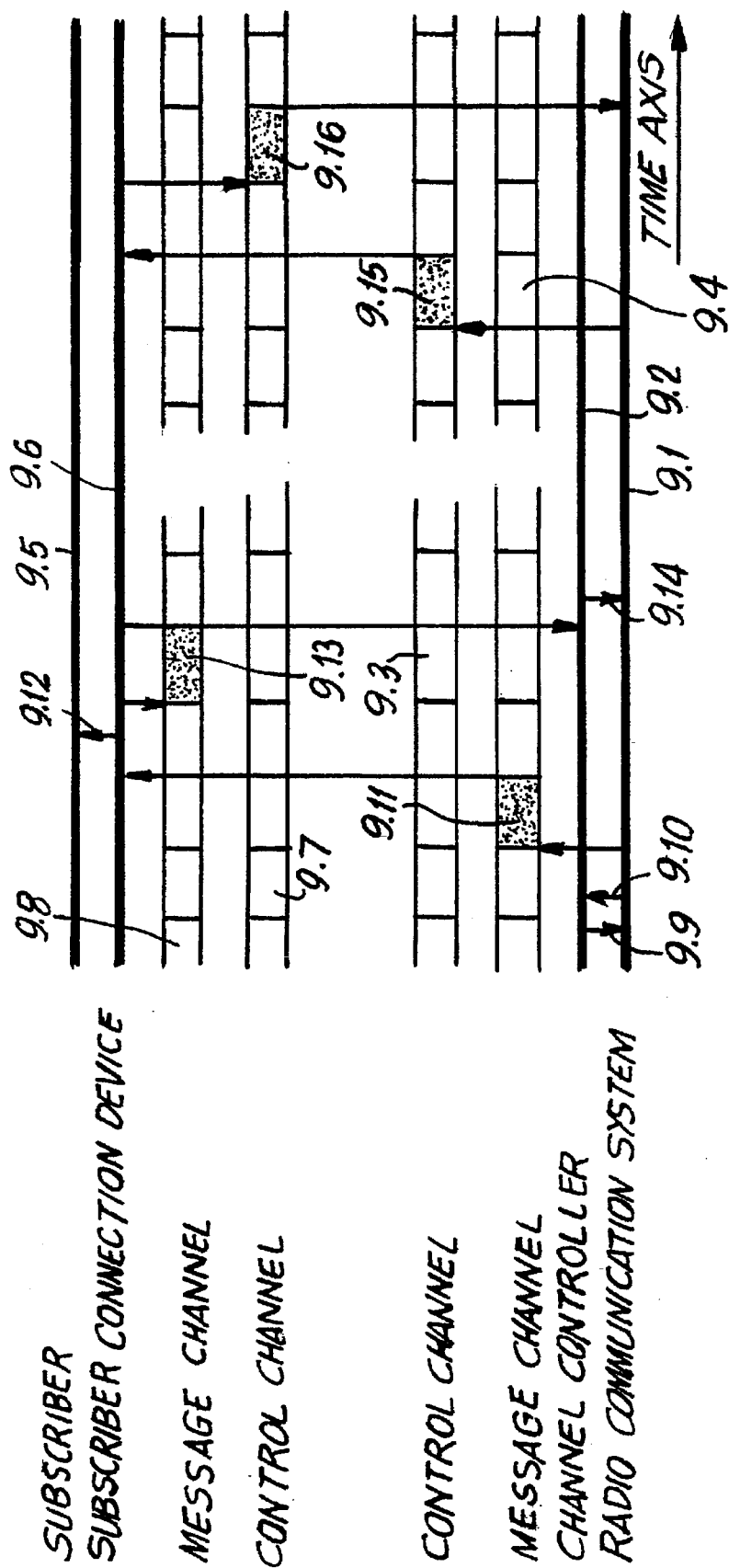
Figure 10:
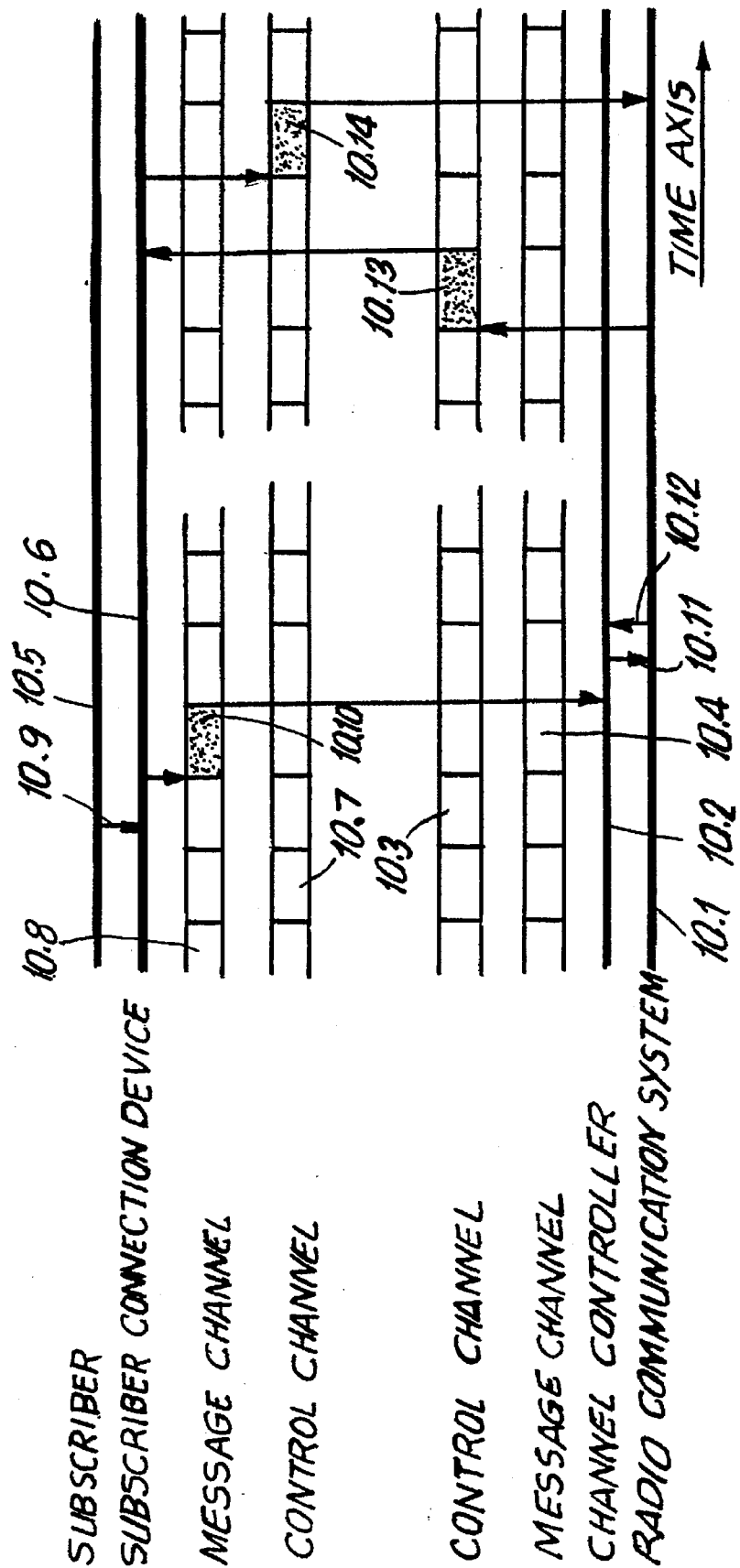

FIG. 7 Standard switching routine in the radio section for an incoming call for a subscriber FIG. 8 Standard switching routine in the radio section for a call request by a radio subscriber FIG. 9 Standard routine for termination of a call initiated by the telephone exchange system FIG. 10 Standard routine for termination of a call initiated by the radio subscriber

BEST WAYS OF MAKING THE CONNECTION

The solution proposed by the invention, which is represented in two different variants in FIG. 2 and FIG. 4, contains a concept of a kind in which no switching to the subscriber plane is performed in the telephone area. A telephone switching apparatus, which is a component of the system, switches from the inputs (channels), through which it is connected to the telephone network or to a dialing set of a local communication apparatus, directly to the duplex radio channels (message channels N1 to Nn), and only in the radio section is the switching to the subscriber plane performed. For the channel numbers to be connected, n>n' (see FIG. 2) and a>a' (see FIG. 4) in order to assure that, even if the capacity for telephone connections characterized by n' and a' is completely used up, a capacity for connections internal to the system—local calls—remains available. Both n and (a·30) are smaller than the number of radio subscribers.

This concept avoids the use of two relatively large switching units as in the WCL system where they are connected to one another through the subscriber plane. Only a comparatively small switching apparatus is needed.

In FIG. 2 the basic principle of the solution proposed by the invention according to claims 1, 2, 4, 5 ff. is represented in the case of connection to E&M ports of a telephone switching apparatus 2.1, which is a component of the equipment. It switches from the inputs E1 to En' to the E&M ports E&M1 to E&Mn. The E&M ports of the telephone switching apparatus are connected to control groups and switching components 2.31 to 2.3n (hereinafter called channel controllers), which in turn are connected through a common data bus Db to the radio communication system 2.2 which stores paging information and signals the presence of such information to a subscriber. The channel units 2.41 to 2.4n, which make up the duplex radio channels are connected to the channel controller. The telephone switching apparatus performs a channel-related switching that does not vary with the subscriber.

The channel controller connected to the E&M ports of the telephone switching apparatus and constructed according to FIG. 3 are so operated via the data bus Db that they all generate the line signals, busy signals and disconnect signals as well as call signals necessary for the operation of the E&M interface and thus simulate a subscriber. Due to the insertion of the channel controller the signaling is not made from the E&M port to the message channel, but is transferred via the data bus Db to the radio communication system and from the latter to the control channel according to a special control channel protocol. For this purpose the two symmetrical NF line pairs Rx/Rx and Tx/Tx are switched to the symmetry converters 3.7 and 3.8, and the asymmetrical NF signal lines Ru and Tu are connected through the electronic switches 3.5 and 3.6 to the message channel, the sending direction and receiving direction, respectively. The MFV receiver 3.3 is switched to line Ru, which transfers the incoming dialing signals to the processor unit 3.1, and the MFV transmitter 3.2, which issues data issued by the processor unit 3.1 as MFV dialing signals toward the E&M interface of the telephone switching apparatus. Furthermore, a modem 3.4 is connected to the processor unit 3.1 and its sending and receiving ports are switched to the selector switches 3.5 and 3.6, respectively.

The selector switches can be actuated independently of one another by the processor unit 3.1 so that the modem is connected at the sending and/or receiving end to the message channel, and in these cases the connection between the E&M port and the message channel is interrupted.

The modem 3.4 (see FIG. 3) has to perform three tasks in the system:

Feeding information into the message channel and receiving it from the message channel which are interchanged between the radio communication center and TeleLink during a connection.

Reception of dialing signals which are transferred from the subscriber's dial digitally in the message channel and transfer of the dialing signals to the processor unit which transfers these signals to the MFV transmitter 3.2 (see FIG. 3) and thus executes an MFV selection.

Feeding digital signals into and receiving them from the message channel for the purpose of transmitting numerical or alphanumerical information to a subscriber connecting device or group of such devices, which are stored in the subscriber connecting device and their input is signaled optically and acoustically to the subscriber and can also be evaluated by him at a later time (henceforth called paging), performing remote calls for service purposes (henceforth called remote service) in subscriber switching devices, and for the utilization of the message channel as an additional control channel.

The lines Mx and Ex of the E&M ports of the telephone exchange apparatus are connected through level changer 3.9 to the processor unit, which by this route performs the signaling for seizure, detection of seizure, acknowledgement and detection of acknowledgement. The processor unit is connected to the radio communication system via the data bus Db.

Not shown, but a component of the invention, is that one processor unit may comprise several channel controllers.

In FIG. 4 is shown the basic principle of the system proposed by the invention according to claims 1, 3, 4, 5 ff. in case of the use of a digital telephone exchange 4.1 which is a component of the system. This exchange switches from (a'·30)-PCM input channels according to the switching capacity and PCM hierarchy to (a) primary multiplex terminals as subscriber outputs. Both (a'·30) and (a·30) are less than the number of radio subscribers (subscriber switching devices 4.51 to 4.5x), i.e., x>(a·30), (a'·30).

The subscriber outputs of the telephone exchange apparatus are connected to control and switching units 4.31 to 4.3(a·30) (hereinafter called channel controllers), which in turn are connected through a common data bus Db to the radio communication system 4.2. The channel units 4.41 to 4.4(a·30), which accomplish the duplex radio channels.

The PCM channels for synchronization and signalization, generally channels 16 and 0 of each PCM-30 output group, are not connected to $S_{2M}$ signal converters, but connected directly to the radio communication unit, which communicates with the telephone exchange through these connections according to E&M or $S_{2M}$ protocol, and which converts the signals according to the special control channel protocol into the control channel. In this embodiment the channel controllers have the task only of connecting the subscriber outputs of the telephone switching system to the message channel and acknowledgement the connection whenever signaling is to be fed into the message channel by the radio switching device.

The radio switching system can additionally be connected through a data interface Dv (see FIGS. 2 and 4) to the telephone switching device if the latter also has a suitable data interface. If this interface permits appropriate access to the computer core of the telephone exchange the signaling can be carried on through this interface and therefore independently of later types of interfaces for signaling.

At the same time the radio switching device (see FIG. 2 or FIG. 4) is connected via the data bus Db to a controlling and switching device 2.30 or 4.30 (hereinafter called the control channel controller) to which a channel unit 2.40 or 4.40 is connected, forming a duplex radio channel which is used as an control channel.

In the control channel a constant communication is provided by the radio switching device according to a random access process, and on the basis of a special control channel protocol, with the operating and inactive subscriber connection devices 2.51 to 2.5x or 4.51 to 4.5x.

The subscriber connection devices are operated exclusively to create a telephone connection or to perform complex service functions in one of the message channels. This means that, when there is a call for a radio subscriber, the telephone communication system hooks up any free E&M or PCM port (see FIG. 2 or FIG. 4) and the signaling and the call number of the called subscriber (dial selection) are transferred to the radio switching system. The following reactions can be sent to the telephone communication system by the radio switching device through the same routes:

Subscriber is unknown:
  Cut the connection or, in a more comfortable variant, give a message, "There is no such number," and then cut the connection.

Subscriber's switching device is defective or turned off:
  Issue a busy signal for a limited time and cut the connection or, in a more comfortable variant, give the message "Subscriber is temporarily unavailable" followed by cut-off.

Subscriber's switching device is busy:
  Issue a busy signal for a limited time and break the connection or, in a more comfortable variant, give the message, "Subscriber is busy," followed by cut-off.

Subscriber's switching device is free and operable:
  Issue call signal for subscriber A.

If the subscriber switching device to be called is operative the radio switching device transfers the call and the command into the message channel given by the telephone switching system through the control channel controller 2.30 or 4.30 and the channel unit 2.40 or 4.40 (see FIG. 2 or FIG. 4, accordingly) to the called subscriber's switching device 2.51 or 4.51 which then switches into this message channel. The acknowledgement of the subscriber switching device after switching to the message channel is transmitted in the latter and a disconnect process is performed between the channel controller and the subscriber's switching device until the called subscriber picks up the receiver. Only then is the audio channel opened by the channel controller to the channel unit and thus to the radio subscriber and the call signal to subscriber A is turned off.

To create the connection on call by a subscriber the call is transmitted by the subscriber's switching device in the control channel through the channel unit 2.40 or 4.40 and the control channel controller 2.30 or 4.30 to the radio switching device 2.2 or 4.2. The radio switching device reacts as follows according to the existing system conditions.

No message channel is available and the dialed call has no priority identification:
  Issuance of a dialing signal rejection to the subscriber's switching device through the control channel; the subscriber switching device generates a busy signal for the subscriber and returns to the ready state.

No message channel is available and the dial call does have a priority identification:
  Issuance of a dial acknowledgement to the subscriber's switching device through the control channel, selection of an existing telephone connection, preferably a local connection, for cut-off and cut-off of this connection. After cut-off has been made, establishment of connection for the calling subscriber.

An message channel is available:
  Irrespective of the presence of a priority identification, a dial acknowledgement is sent to the subscriber switching device and the connection is made for the calling subscriber.

If a free message channel is available, a line seizure is performed through the data bus Db (see FIG. 2 or FIG. 4) and the channel controller of the selected message channel or through the signaling channel of the appropriate PCM group. When the telephone exchange apparatus acknowledgements the line the subscriber switching device is switched by the radio switching device via the control channel into the selected message channel. After the channel controller has executed the acknowledgement process, the audio channel is connected [by the channel controller] to the channel unit and thus to the radio subscriber, whereupon the subscriber switching device first performs the transmission of its subscriber Identification and then the transmission of the dialing. The subscriber identification is used by the telephone exchange device to charge for the calls.

For breaking connections the following ways are provided:

The radio subscriber hangs up:
  After the subscriber hangs up the subscriber switching device sends a termination signal in the message channel, switches back to the control channel, and changes over to the ready state. The termination signal is received by the channel controller which then transmits the termination signal directly via the E&M interface or via the data bus Db, radio switching device and $S_{2M}$ signaling channel.

The radio subscriber at the other end hangs up:
  The termination signal is sent via the E&M interface directly to the channel controller or via the $S_{2M}$ signal channel, radio switching device and data bus Db. A cut-off command is sent by the channel controller to the subscriber switching device, the latter sends the subscriber a short end signal, switches back into the control channel, and passes over into the ready state. The breaking of the connection is signaled to the radio switching device by the channel controller.

The radio connection is interrupted through a time sensing threshold:
  Channel controller and subscriber switching device check for the presence of a signal worth receiving to the particular subscriber inputs. If the duration of an interruption exceeds a preset time sensing threshold, each position reacts as if the other position was signaling a termination of a connection. The radio switching device checks the control channel for the presence of this subscriber switching device.

The radio switching device passes the subscriber-related communication through, and for this purpose it:

carries a subscriber data base containing all of the registered subscriber switching devices with their telephone number, their subscriber number in the radio switching system, their account number for billing, their security code and their serial number, and containing the current "free," "busy," or "not available" working status of the subscriber switching device, and the level setting for transmission to the subscriber switching device, and carries a list of channels in which the current free or busy states of the message channels are contained;

a switching data base containing all presently running communication processes with their content and time phases, and serving to control the activities in the control channel and communication with the telephone exchange through channel controllers or the $S_{2M}$ signaling channel.

The control channel operates on digital time-multiplex communication, in which it works in time slots of constant length with a data frame shown in FIG. 5. In an exemplary embodiment, the elements of the data frame can assume the meaning, structure and values represented in Table 1. Operation in the control channel is conducted on the master-slave principle as represented in FIG. 6. This means that the subscriber switching devices answer always with a constant time shift of at least one data frame length the transmissions from the radio switching system. FIG. 6 shows by way of example operation with a time shift of two data frame lengths. Communication with the subscriber switching devices is conducted by the radio switching device in a random access process in which the subscriber switching devices are called by address if necessary (see Table 2), except for free calls which contain no addressing and allow all subscriber switching devices to perform the appropriately time-shifted transmission of calls for the dial tone (see Table 4).

TABLE 1

| | Emission from | | | | |
|---|---|---|---|---|---|
| | Subscriber switching device | | Stationary radio station | | |
| Name | Bit | Hex | Bit | Hex | Remarks |
| VO Precursor | 32 | | 8 | | L/O sequence )[1] |
| C Code block | 22 | | 22 | | 2 × 11-place bar code |
| T Subscriber number part | 24 | 3 | 24 | 3 | (8,4)-coded |
| I Message part | 24 | 3 | 40 | 5 | (8,4)-coded |
| P Check-sum part | 16 | 2 | 24 | 3 | (8,4)-coded |
| N Follower | 2 | | 2 | | )[2] |
| Z Total time slot | 120 | | 120 | | |

)[1] It is possible to reduce the length of the precursor drastically to a few bits in transmission from the radio station to the subscriber switching devices to the benefit of the message part and check sum part, since the radio station transmits continually and thus no phase jumps occur in the signal.
)[2] In transmission from the radio station to the subscriber switching devices, 2 bits high are sent, while in transmission from the subscriber switching devices to the radio station no emission takes place, so that the propagation time differences between two successive transmitting subscriber switching devices upon being received in the radio station will not result in overlapping.

In accordance with FIG. 5 and Table 1, 4096 call numbers can be formed at T with 3 hexadecimal places, while at I a division into one position command code and 2 and 4 positions data code is permitted with 3 and 5 hexadecimal positions, respectively.

If at T, I and P, 4 bits net information are transmitted BCH (8,4) coded, one bit error can be corrected and two bit errors recognized for 4 bits net information. Since more than two bit errors are not detectable, the check sum P is additionally introduced, which comprises 2 and 3 hexadecimal positions at the above-mentioned values.

The transmission of T, I and P is performed by block interleaving. For 8*(8,4) bits gross information (interleaving factor equal to 8) in the direction from the subscriber switching devices to the stationary radio station and 11*(8,4) bits gross information (interleaving factor equal to 11) in the direction from the radio stationary station to the subscriber switching devices it is thus possible to correct burst errors with a length of 8 and 11 bits, respectively.

In the transmission direction from the stationary radio station to the subscriber switching devices, the command types are available which are listed in Table 2.

| Abbre- viation | Subscriber number part | | | Message part | | | Meaning |
|---|---|---|---|---|---|---|---|
| | 1 | 2 | 3 | 1 | 2 | 3 | |
| F.. | i | i | i | B | i | i | Free call |
| N.. | 13 H | i | i | B | i | i | Conditional call |
| K.. | t | t | t | B | k | k | Channel assignments |
| Q.. | t | t | t | B | i | i | Acknowledgements |
| A.. | t | t | t | B | i | i | Presence check. Disconnect commands. |
| H.. | t | t | t | B | a | i | Paging |
| T.. | t | t | t | B | i | i | Technical Service |

B  Command removal point
i ≡ 4 bits freely available for entry of information
t ~ 4 bits busy with subscriber number
k ≡ 4 bits busy with channel number
a ≡ 4 bits busy with criterion for selection Free calls F.. corresponding to Table 2 are distinguished as
FT Free call with time information
The hexadecimal places marked "i" are occupied by clock time information and
FD Free call with date information
The first hexadecimal place in the subscriber number part is occupied by "D" (13H) as removal criterion for date and the hexadecimal places marked "i" are occupied by date information.

Conditional free calls N.. corresponding to Table 2 are identical to F.. as regards NT and HD. The time and date data are inserted alternately into the emission of these commands.

Channel assignments K.. corresponding to Table 2 are distinguished as follows:

KK Channel assignment upon a call for a radio subscriber.

KG Channel assignment on a radio subscriber call request.

KS Channel assignment for the practice of remote service to the subscriber switching device, for the transfer of multi-point paging data in the message channel, this channel assignment being able to apply also to groups of subscriber switching devices according to a selection criterion, and for carrying out dynamic characteristic ring change (ring characteristic of the subscriber switching device in radio operation).

Acknowledgements Q.. are distinguished according to Table 2 as follows:

Qw Acknowledgement of calls for dial tone after signaling when a radio subscriber wants to make a call. For the subscriber switching device this means that the call for dial tone is accepted, and wait for channel assignment.

QA Rejection of call request after pickup by a radio subscriber wanting to make a call. For the subscriber switching device this means that the pickup is not accepted and a busy code is to be generated for the subscriber.

Presence commands A.. according to Table 2 are divided into

AK Command for checking the presence or the readiness of subscriber connection devices.

AB Command to interrupt an existing talk connection, which is transmitted in the message channel and causes the subscriber switching device to switch back into the control channel and send the subscriber a time-limited busy signal.

Paging commands P.. according to Table 2 are divided into

PR Paging call with transmission of a one-digit numerical message (message part, 3rd place).

PR/GK Paging call with transmission of a multi-digit alphanumerical message in the voice channel. Command is a preparatory command, the command is transmitted in the second to the next time slot into a voice channel by a KS channel assignment.

Both these commands can be divided in accordance with Table 3 by means of a selection criterion a in the 2nd position of the message part in the data frame (see Table 2) into individual and different kinds of group calls.

The letters a, b, c and d represent the bits of the 2nd position of the message part. In this case d is used as the selection criterion for the commands PR and PR/GK, as is represented in Table 3 in an exemplary embodiment. Positions c, b and a are used as the selection criteria for the validity of the 1st, 2nd and 3rd positions in the calling number of the subscriber connection device. In the case of a calling number in the radio range with three hexadecimal places, 16 main groups of 16 sub-groups each and again 16 members each, are defined by position selection. By the process of establishing the validity or invalidity of each position in the calling number, established, for example, in Table 3 as:

$$c, b, a = \text{position 0 is valid}$$
$$= \text{position 1 is irrelevant,}$$

the call possibilities of the individual subscribers (commands 1 and 6) and groups (commands 2 to 5 and 7 to 10) are the result shown in Table 3.

TABLE 3

| | 2. Positon of the message part in the case of P.. commands | | | | |
|---|---|---|---|---|---|
| P.. | Hex | d | c | b | a | Meaning |
| | 0 | 0 | 0 | 0 | 0 | PR single call |
| | 1 | 0 | 0 | 0 | 1 | PR sub-group |
| | 2 | 0 | 0 | 1 | 0 | PR sub-group leader |
| | 3 | 0 | 0 | 1 | 1 | PR main group |
| | 4 | 0 | 1 | 0 | o | PR main group leader |
| | 8 | 1 | 0 | 0 | 0 | PR/GK single call |
| | 9 | 1 | 0 | 0 | 1 | PR/GK sub-group |
| | A | 1 | 0 | 1 | 0 | PR/GK sub-group leader |
| | B | 1 | 0 | 1 | 1 | PR/GK main group |
| | C | 1 | 1 | 0 | 0 | PR/GK main group leader |

It is an effect of the invention that a "horizontal" group selection is made possible by the fact that a call for all members of a main group (commands 4. and 9.) or sub-group of a main group (commands 2. and 7.) can be sent, that a "vertical" group selection is made possible, that a call for all routers of the main groups (or representatives or other equivalents of all main groups) (commands 3 and 8) can be sent without the need to remove numbers from the available range of subscriber numbers.

A second effect of the invention is that the group call can be started with the knowledge of a single call number of the circle of the subscribers belonging to the group and the addition of the group criterion.

The effect of the invention will be explained by two examples:

1. The subscriber with the call number 768 (decimal) and group paging for main group routers with one-position paging information is selected. The radio exchange system transmits the paging command in the control channel with the 300 (hexadecimal) call identification and the paging command part 4 (see Table 3). The subscriber connection devices then ignore the first place of the call identification, so that all devices with the call number ..00 are addressed.

2. The subscriber with the call number 1202 (decimal) and group call for sub-group router is selected with multiple-position paging information. The radio exchange system transmits the paging command in the control channel with the call number 4B2 (hexadecimal) and the paging command 8 (see Table 3). The subscriber connection devices then ignore the 2nd position of the call identification, so that all devices with the call number 4..2 are addressed (number 2 of all sub-groups of the 4th main group).

Technical Service T.. corresponding to Table 2 is divided into:

1. Commands for setting device parameters of the subscriber connection device, such as transmit power or deemphasis of the receiver or others, where the setting value or the stepping direction for a one-step change in the message part of the command is transmitted in the control channel and the subscriber connection device acknowledges the command by repeating or sending queried values in the control channel.

2. Command for switching the subscriber connection device into a message channel for service purposes, with the effect that the subscriber connection device is blocked against use by the subscriber, and after switching into the message channel, a connection is made which is not bound by the protocol of the control channel (e.g., for a dynamic changing of the call ID of the subscriber connection device, for transmitting the charge pulses of the last communication and totaling the charge pulses, for initializing the subscriber connection device when put into operation, for set testing and for updating the software of the subscriber connection device).

In the direction of transmission from the subscriber connection devices to the radio station, the types of commands given in Table 4 are available:

TABLE 4

| Abbre-viation | Subscriber Number Part | | | Message Part | | | Meaning |
|---|---|---|---|---|---|---|---|
| | 1 | 2 | 3 | 1 | 2 | 3 | |
| W.. | t | t | t | B | p | p | Call Request |
| A.. | t | t | t | B | p | p | Log-ons/Log-offs |
| P.. | t | t | t | B | i | i | Paging response (selective ringing) |
| T.. | t | t | t | B | i | i | Technical service response |

B Command removal position
≡ 4 bit freely available to carry message
t ≡ 4 bit busy with subscriber number
p ≡ 4 bit busy with subscriber ID The control channel protocol controls the switching processes in the radio area and is represented in its basic functions in:

FIG. 7 Call for subscriber

FIG. 8 Call request by subscriber

FIG. 9 Disconnect produced by the telephone exchange system, and

FIG. 10 Disconnect produced by the radio subscriber.

All the figures contain, vertically, the signal transfer between x.1 Radio communication system/control channel controller, x.2 Channel controller of the message channel used, x.3 Control channel in the direction from the radio communication system to the subscriber connection device.

x.4 Message channel used in the direction from the radio communication system to the subscriber connection device.

x.5 Subscriber/subscriber terminal device.

x.6 Subscriber connection device/link controller x.7 Control channel in the direction from the subscriber connection device to the radio communication system.

x.8 Message channel used in the direction from the subscriber connection device to the radio communication system and, in the horizontal direction the protocol handling with respect to time.

In the case of a call for a radio subscriber as represented in FIG. 7, when the line has been seized by the telephone exchange and the channel controller 7.2 has acknowledged seizing of the line, the dialing number of the called subscriber is received by the channel controller (these processes are not shown in the drawing), and the seizing of the line and the subscriber number is sent by the message 7.9 to the radio communication system 7.1; when this message is checked correct at the channel controller, the radio communication system sends the subscriber connection device 7.6 an acknowledgement and a signal instruction 7.10 (in this case a response signal to subscriber A), and a channel command in control channel 7.3 for an incoming call 7.11 to the subscriber connection device 7.6. The subscriber connection device thereupon switches into the assigned message channel 7.8, sends its response 7.12 in the latter, and generates the call code. 7.13 for the subscriber 7.5. The response received from the subscriber connection apparatus is transmitted to the radio exchange system with the message 7.14. The radio exchange checks the subscriber ID and subscriber identification number and, upon acceptance, sends a positive response 7.15 to the channel controller. Beginning at this moment a dummy-run signaling is performed between channel controller and subscriber connection device until the subscriber picks up, which is not represented in the drawing. After the loop 7.16 is closed (pick-up by the subscriber) the "subscriber calling" signal 7.17 is sent by the subscriber connection device in the message channel, whereupon the channel controller turns off the free code for subscriber A, puts through the NF connection from the telephone exchange to the message channel, and sends a message to the radio exchange apparatus on the making of the connection 7.18, which is acknowledged by a message 7.19 from the radio exchange system.

When a subscriber makes a call, in accordance with FIG. 8, when the line loop 8.9 is closed (subscriber picks up 8.5) the subscriber connection device 8.6 generates the dial signal for the subscriber, who then starts dialing. The dialing data 8.11, 8.12 and 8.14 is stored in the subscriber connection device and checked for the presence of a priority code. At the same time the subscriber connection device checks whether the radio communication system 8.1 has transmitted or will transmit a free signal or other command 8.13 in the control channel 8.3 permitting a free signal or other command 8.13, which permits the announcement of a call, and then the transmission of the call request 8.15 is performed in the control channel. In the case of a call request with a priority code, it can be transmitted even if 8.13 was a conditional free call. After the call request is received the radio communication system selects a message channel 8.4 and sends the channel controller 8.2 of this message channel a signal 8.16 to perform a line capture at the interface to the telephone exchange apparatus. Furthermore, the radio communication system sends the subscriber connection device an acknowledgment of the call request 8.17. When a successful line capture has been made the subscriber connection device switches over into the assigned message channel 8.8 and sends a signal 8.20 in it, and then the channel controller opens the telephone pathway to the message channel. The circuit of the telephone connection and the subscriber data are reported by the channel controller of the radio communication system at 8.21 and acknowledged by the latter at 8.22. Every time the messages 8.15 and 8.21 are received the radio communication system checks the call ID code and the subscriber identification number, and only upon acceptance are the corresponding positive responses 8.16, 8.17 and 8.22 given.

After the signal 8.20 is emitted the subscriber connection device begins to transmit the dialing data 8.23, 8.34 ff. which up to then have been entered by the subscriber into the buffer memory. After these dialing codes have been sent the subscriber connection device opens the telephone path to the subscriber terminal equipment, so that additional dialing by the subscriber is transmitted directly.

After a call is terminated and the telephone exchange apparatus has broken the connection as shown in FIG. 9, and after call clear-down with signal and acknowledgement between the telephone exchange and the channel controller 9.2, which is not shown in the figure, a signal 9.9 is transmitted by the channel controller to the radio communication system 9.1 which acknowledges with 9.10. Also, the channel controller transmits a disconnection signal 9.11 to the subscriber connection device 9.6 in the message channel 9.4. The subscriber connection device generates an end code 9.12 for the subscriber and after that cuts the line loop to the subscriber terminal equipment. Furthermore, the subscriber connection device sends a deactivation signal 9.13 in the message channel 9.8, switches back into the control channel 9.7, and passes over into the stand-by state. After receiving the deactivation signal 9.13 of the subscriber connection device is received The channel controller 9.2 transmits a signal 9.14 to the radio communication system on the breaking off of the connection in the radio area. After an undetermined time period the radio communication system sends a presence check 9.15 in the control channel 9.3, which is acknowledged by the subscriber connection device in the control channel with a presence signal 9.16.

After a call is terminated and the subscriber has broken the connection as shown in FIG. 10, and the line loop 10.9 has been interrupted (subscriber hangs up), a disconnection signal 10.10 is sent in the message channel 10.8 by the subscriber connection device 10.6. The latter then switches over into the control channel and changes to stand-by. After receiving the disconnect signal, the channel controller 10.2 performs the clear-down operation (not shown in the drawing) and sends the radio exchange system 10.1 a disconnect signal 10.11 which is acknowledged by the radio communication system at 10.12. After an undetermined interval of time the radio exchange system 10.1 sends a presence check 1.13 in the control channel 10.3, which is acknowledged in the control channel 10.7 by the subscriber connection device with a presence signal 10.14.

(1) Mandel, Günter; Kercher, Klaus: DAL in analog-zellularer Technik Nachrichtentechnik, Elektronik, Berlin 42 (1992) 4

(2) Leipold, Peter: DAL-Funktechnik im Teilnehmeranschlussbereich NTZ 45 (1992) 4

(3) EP 0 311 966 A2, A3

(4) DE 41 28 811 A1

(5) Buckingham, Colin; Wolterink, Ge Klein; Akerberg, Dag: A business Cordless PABX Telephone System on 800 MHz based on the DECT Technology IEEE Communications Magazine, January 1991

(6) GB 2.247.822 A (7) EP 0 497 490 A2

INDUSTRIAL USEFULNESS

The invention is industrially useful in telecommunications.

We claim:

1. A local exchange and transmission system comprising:

a telephone switch having a plurality of inputs connectable to a telephone network and a plurality of outputs receptive of telephone transmission signals for connecting the inputs and outputs to transmit calls to and from the telephone network, wherein the plurality of outputs is a greater number than the plurality of inputs;

a duplex radio channel unit for each of the plurality of outputs forming an information channel for transmitting and receiving wireless telephone transmissions to a plurality of wireless subscriber radio connection devices usable by wireless subscribers to send and receive telephone transmissions, wherein the plurality of wireless subscriber radio connection devices is a greater number than the plurality of outputs;

a channel controller connecting each duplex radio channel unit to one of the plurality of outputs;

at least one duplex radio organization channel including a channel controller and a duplex radio channel unit for constantly receiving information from the wireless subscriber radio connection devices; and a radio communication controller connected to all of the channel controllers by a data bus for controlling the channel controllers to establish a direct connection between a wireless subscriber and the telephone network over an information channel with information received on the at least one organization channel and to simulate a wire subscriber connection for an incoming call until a direct connection is made between the connection device and the telephone network over an information channel.

2. The system according to claim 1, wherein the plurality of outputs are E&M ports and wherein the radio communication controller communicates with the telephone switch through a channel controller.

3. The system according to claim 1, wherein the plurality of outputs are PCM channels and wherein the radio communication controller communicates with the telephone switch according to an E&M or an $S_{2M}$ protocol.

4. The system according to claim 1, wherein the telephone switch is a digital telephone switch and wherein the radio communication controller communicates with the telephone switch through a digital data interface.

5. The system according to claim 1, wherein the radio communication controller controls at least one channel controller of an information channel over the data bus to permit at least one information channel to temporarily act as an organization channel and to report the at least one information channel as busy to the system.

6. The system according to claim 1, wherein the channel controller of the at least one organization channel communicates with the connection devices over the at least one organization channel using an organization channel protocol.

7. The system according to claim 1, wherein each connection device has a link controller for communicating with the radio communication controller through the at least one organization channel and has a telephone adapter component for connecting to an information channel to simulate a wire subscriber connection for an outgoing call from a wireless subscriber until a direct connection is made between the connection device and the telephone network over an information channel.

8. The system according to claim 6, wherein the organization channel protocol is a digitally time-multiplexed transmission which is synchronous in both directions and which has no main frame structure and wherein data frames are transmitted in successive time slots of constant length and each frame includes an instruction comprising a precursor, code block, subscriber number part, information part, checksum part and follower.

9. The system according to claim 8, wherein the data frame contains the same instruction structure in both directions.

10. The system according to claim 8, wherein the data frame is not identical in both directions.

11. The system according to claim 1, wherein the radio communication controller transmits a free call signal on the at least one organization channel if at least one usable information channel is available and transmits a conditional free call signal if no usable information channel is available, whereby the connection devices can request a dial tone after a free call signal and a dial tone call with priority after a conditional free call signal.

12. The system according to claim 1, wherein the radio communication controller transmits no dial tone release signal when a plurality of connection devices simultaneously call and wherein each connection device has a link controller for generating a busy signal for the subscriber when there is no dial release signal.

13. The system according to claim 11, wherein each connection device sends a dial signal and stores the numbers dialed by a subscriber and upon the receipt of a free call signal, transmits a dial tone signal or a busy signal to the subscriber.

14. The system according to claim 11, wherein the link controller produces a dial tone request with priority if no dial tone release signal is received in response to an initial dial tone request with priority and thereafter produces a busy signal.

15. The system according to claim 1, wherein the radio communications controller interrupts an existing connection upon the receipt of a dial tone request with priority if no usable information channel is available and send a busy signal thereto.

16. The system according to claim 1, wherein the connection device switches over from the at least one organization channel to an information channel and wherein the transmissions on the organization channel relating thereto are a free call.

17. The system according to claim 8, wherein for a free call signal and a conditional free call signal, the subscriber number part and the data part are alternately occupied by date and clock time information for setting a software clock in the connection device.

18. The system according to claim 8, wherein paging information is transmitted in the at least one organization channel in one time slot.

19. The system according to claim 8, wherein paging information is transmitted in a first command in the at least one organization channel and in a second command on an information channel along with paging information and wherein the radio communication controller reports the information channel as busy.

20. The system according to claim 8, wherein the connection device has a link controller for storing paging information and signaling a subscriber of the presence thereof.

* * * * *